United States Patent Office
3,812,099
Patented May 21, 1974

3,812,099
POLYMER DERIVATIVE OF 1-METHYL-5/5-OXO-4-ETHYL-TETRAHYDROFURYL - (3) - METHYL/IMIDAZOLE WITH CELLULOSE GLYCOLIC ACID
Nadezhda Alexandrovna Kashkina, ulitsa Talsu 99/11, kv. 22; Milda Yanovna Pormale, ulitsa Suvorova 104, kv. 10; Arvid Yanovich Kalninch, ulitsa Sverdlova 8, kv. 3; Yanis Shusters, ulitsa Kveles 15, korpus 4, kv. 30; Guna Robertowna Dambite, ulitsa Gorkogo 37, kv. 20; Ipatiya Marcewna Reinberg, ulitsa Pumpura 5, kv. 8; Idea Wladimirowna Walkowa, ulitsa Mersroga 7, kv. 2; Wiya Aleksandrowna Tipaine, ulitsa Juglas 53, kv. 10; Antons Petrowich Skutelis and Stanislaws Kazimirowich Yankowskis, both of ulitsa Marupes 17, kv. 32; and Inese Petrowna Olina, ulitsa Lachplesha 36, kv. 21, all of Riga, U.S.S.R.
No Drawing. Continuation of application Ser. No. 68,009, Aug. 28, 1970. This application June 23, 1972, Ser. No. 265,693
Int. Cl. C08b 11/14, 15/06
U.S. Cl. 260—213
3 Claims

ABSTRACT OF THE DISCLOSURE

The present invention relates to a new compound which is a polymer derivative of 1-methyl-5-/5-oxo - 4 - ethyl-tetrahydrofuryl - (3) - methyl/-imidazole with cellulose glycolic acid of the general formula

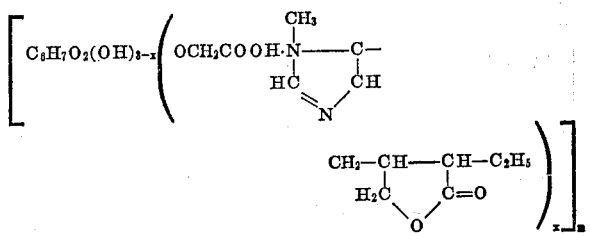

where $x$ is substitution degree from 75 to 100, $n$ is polymerization degree from 30 to 120. The method of the invention for producing said polymer derivative of 1-methyl - 5 - /5 - oxo - 4 - ethyl - tetrahydrofuryl-(3)-methyl/-imidazole with cellulose glycolic acid consists in that 1-methyl-5-/5-oxo - 4 - ethyl-tetrahydrofuryl-(3)-methyl/-imidazole is reacted with cellulose glycolic acid in an aqueous medium, and the desired product is subsequently isolated. Said compound is an active principle of a medicinal preparation featuring M-cholinomimetic action.

---

This is a continuation of application Ser. No. 68,009, filed Aug. 28, 1970, now abandoned.

The present invention relates to a new compound which is a polymer derivative of 1-methyl-5-/5-oxo - 4 - ethyl-tetrahydrofuryl - (3) - methyl/-imidazole with cellulose glycolic acid, and also to a method of producing the compound and application thereof.

Said new compound, according to the invention, has the following general formula:

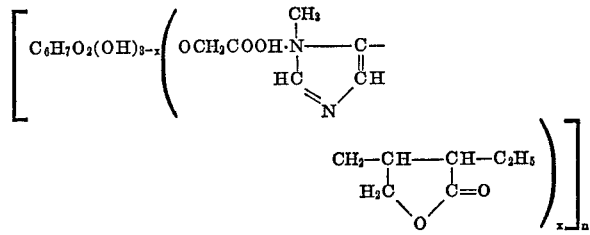

where
$x$ is degree of substitution from 75 to 100, and
$n$ is degree of polymerization from 30 to 120.

The compound proposed herein is an amorphous substance, slightly yellow in color, hygroscopic, readily soluble in water, insoluble in organic solvents, decomposing under the action of alkali.

Said compound features M-cholinomimetic action and is an active principle of a medicinal preparation.

The medicinal preparation with M-cholinomimetic action, according to the invention, comprises said active principle in combination with a diluent or an ointment base.

The mechanism of action of said medicinal preparation does not differ from that of pilocarpine hydrochloride, but the present medicinal preparation is noted for its greater activity and prolonged action. The M-cholinomimetic activity of the present preparation was compared with that of pilocarpine hydrochloride by testing 5–10 different concentrations ($3 \cdot 10^{-7}$ mmol./lit.–$5.3 \cdot 10^{-6}$ mmol./lit.) of solutions of said preparations on the $M.$ $rectus$ of the frog.

The exposure time for each of the test concentrations was 2 minutes, after which the muscle was washed to its initial tonus.

The experiments have shown the contraction to be always stronger (by as much as 1.5 times) with the present preparation, as compared to pilocarpine, in case of applying the both preparations in the same concentrations to the same muscle.

Comparative tests of the M-cholinomimetic activity and duration of action of the proposed preparation and pilocarpine hydrochloride were carried out on white rabbits. The animals were treated with solutions of the both preparations in concentrations from 0.0625 to 2 wt. percent, by instillation. The myosis phenomena observed with white rabbits at various concentrations of the instilled preparations indicated the activity and duration of action of the present preparation to be 1.5–3 times greater than those of pilocarpine hydrochloride.

The present preparation was studied for acute toxicity on 102 white mice, both male and female, by intra-abdominal injection of 1–3% solutions of pilocarpine hydrochloride and of the present preparation in doses of 100–600 mg./kg. Each dose was administered to a group of animals comprising 6–12 individuals.

The external clinical picture of the acute intoxication revealed no essential difference between the present preparation and pilocarpine.

The preparation proposed herein finds application, mainly, in ophthalmiatrics for treating primary glaucoma, but it can also be used for treating adynamic ileus, trombosis of the central vein of retina, acute obstruction of the retinal artery, atrophy of the optic nerve, etc.

Said preparation was clinically tested on 48 patients suffering from primary glaucoma, both, hospitalized and ambulatory. The patients treated with the present preparation were those who had already passed their course of treatment with pilocarpine, physostigmine, phosphacol, tosmilene, etc., but with no sufficient effect. A 1–2% solution of the present preparation was instilled to the patients 3–4 times a day. The administration of the preparation resulted in a reduction of the intraocular tension and in stabilization thereof. In one third of the cases the therapeutical effect was complete, in another third it was partial. No side effects were observed, even when the present preparation was applied over a long period of time (more than a year).

Said preparation is used in the form of aqueous solutions and ointments. According to the invention, bi-distilled water is used as a diluent. The content of the active principle in the aqueous solutions of the preparation is 1.1–2.3 wt. percent.

In ointments aqueous lanoline, Vaseline are employed as a base or carboxymethyl cellulose as a polymeric base.

The content of the active principle in ointments is 1.1–4.6 wt. percent.

The preparation is contraindicated for cataract in combination with glaucoma.

The method of producing said compound, i.e., a polymer derivative of 1-methyl-5-/5-oxo-4-ethyl-tetrahydrofuryl-(3)-methyl/-imidazole with cellulose glycolic acid, according to the invention, consists in reacting 1-methyl-5 - /5-oxo-4-ethyl-tetrahydrofuryl-(3)-methyl/-imidazole with cellulose glycolic acid in an aqueous medium, followed by isolation of the desired product.

For enhancing the quality of the final product, the starting materials, that is, 1-methyl-5-/5-oxo-4-ethyl-tetrahydrofuryl - (3) - methyl/-imidazole and cellulose glycolic acid, are taken in equimolecular amounts.

To accelerate the reactions, cellulose glycolic acid is used in the form of an aqueous solution, obtained by passing an aqueous solution of sodium salt of cellulose glycolic acid through an H-form cation exchange resin.

The proposed method is effected as follows.

Cellulose glycolic acid as the starting material is used either dry, or as an aqueous solution. The use of cellulose glycolic acid in the form of an aqueous solution reduces the reaction time by as much as 5–6 times. The cellulose glycolic acid is reacted with 1-methyl-5-/5-oxo-4-ethyl-tetrahydrofuryl-(3)-methyl/-imidazole in an aqueous medium.

The reaction of combination of cellulose glycolic acid with 1 - methyl - 5 - /5-oxo-4-ethyl-tetrahydrofuryl-(3)-methyl/-imidazole is polymer-analogous; the polymerization degree of the cellulose glycolic acid does not change. The process of interaction is carried out under intense stirring, at room temperature. The end of the reaction is checked by measuring the pH of the reaction medium (which should be within 6.8–7.2).

On completion of the process, the desired product is isolated either by precipitating it in acetone or ethanol, or by lyophilic drying of the resulting solution. The yield of the desired product is 95–98 wt. percent.

For a better understanding of the present invention, given hereinbelow are examples illustrating the way in which the present method of producing said compound can be realized.

EXAMPLE 1

10 g. of cellulose glycolic acid (substitution degree 75 and polymerization degree 80) are mixed with 100 ml. of water, and 7.6 g. of 1-methyl-5-/5-oxo-4-ethyl-tetrahydrofuryl - (3) - methyl/-imidazole are added thereinto. The mixture is stirred during 4 hours at room temperature. The pH of the solution is 6.9. Then the obtained solution is filtered and lyophilically dried. The yield of the desired product is 16.9 g. (96% of the theoretical amount).

Calcd. (percent): N, 5.79; 1-methyl-5-/5-oxo-4-ethyl-tetrahydrofuryl-(3)-methyl/-imidazole, 43.2. Found (percent) N, 5.70; 1-methyl-5-/5-oxo-4-ethyl-tetrahydrofuryl-(3)-methyl/-imidazole, 42.8.

EXAMPLE 2

10 g. of sodium salt of cellulose glycolic acid (substitution degree 80 and polymerization degree 80) are dissolved in 200 ml. of water, and the resulting solution is passed through an H-form cation exchange resin (the volume capacity being 4.5–5 mg.-equiv./g.). A solution of cellulose glycolic acid is thus obtained, containing 4.5 wt. percent of cellulose glycolic acid. To 100 ml. of the obtained solution there are added 3.6 g. of 1-methyl-5-/5-oxo - 4-ethyl-tetrahydrofuryl-(3)-methyl/-imidazole. The process is carried out under stirring, at room temperature, during 0.5 hr. The pH of the solution is 7.0. The resulting solution is lyophilically dried. The yield of the desired product is 7.9 g. (97 wt. percent of the theoretical amount).

Calcd. (percent): N, 5.92; 1-methyl-5-/5-oxo-4-ethyl-tetrahydrofuryl-(3)-methyl/-imidazole, 44.4. Found (percent) N, 5.8; 1-methyl-5-/5-oxo-4-ethyl-tetrahydrofuryl-(3)-methyl/-imidazole, 43.8.

What is claimed is:

1. A water-soluble polymer of the general formula

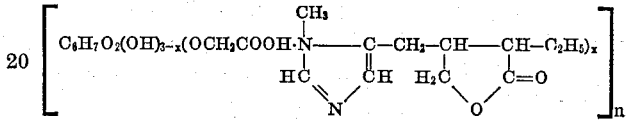

wherein
x is the degree of substitution of from 75 to 100 and
n is the degree of polymerization of from 30 to 120;
prepared by reacting 1-methyl-5/5-oxo-4-ethyl-tetrahydro-furyl-(3)-methyl/-imidazole with cellulose glycolic acid.

2. A method of producing a water-soluble polymer of the general formula

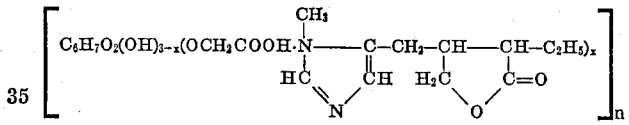

wherein
x is the degree of substitution of from 75 to 100 and
n is the degree of polymerization of from 30 to 120,
comprising reacting 1-methyl-5/5-oxo-4-ethyl-tetrahydrofuryl-(3)-methyl/-imidazole with an aqueous solution of cellulose glycolic acid, said cellulose glycolic acid having a degree of substitution of from 75 to 100 and a degree of polymerization of from 30 to 120, until the pH of the reaction mixture equals 6.8 to 7.2, followed by separating the desired product.

3. The method of claim 2 wherein 1-methyl-5/5-oxo-4-ethyl-tetrahydrofuryl-(3)-methyl/-imidazole and cellulose glycolic acid are taken in equimolecular amounts.

References Cited

UNITED STATES PATENTS

| | | | |
|---|---|---|---|
| 2,772,999 | 12/1956 | Masci etal. | 260—231 |
| 3,214,341 | 10/1965 | Feinstone | 260—231 |
| 3,277,079 | 10/1966 | Press | 260—232 |

DONALD E. CZAJA, Primary Examiner

R. W. GRIFFIN, Assistant Examiner

U.S. Cl. X.R.

424—180

UNITED STATES PATENT OFFICE
CERTIFICATE OF CORRECTION

Patent No. 3812099     Dated May 21, 1974

Inventor(s) Nadezhda A. Kashkina  et al.

It is certified that error appears in the above-identified patent and that said Letters Patent are hereby corrected as shown below:

[30]  Foreign Priority Data:

USSR No. 1375103 filed November 11, 1969

Signed and sealed this 4th day of February 1975.

(SEAL)
Attest:

McCOY M. GIBSON JR.          C. MARSHALL DANN
Attesting Officer             Commissioner of Patents